United States Patent
Flynn (10) Patent No.: US 7,544,021 B2
(45) Date of Patent: Jun. 9, 2009

(54) ROTARY CUTTING TOOL WITH NON-UNIFORM DISTRIBUTION OF CHIP-BREAKING FEATURES

(75) Inventor: Clifford M. Flynn, Pittsfield, MA (US)

(73) Assignee: Berkshire Precision Tool. LLC, Pittsfield, MA (US)

(*) Notice: Subject to any disclaimer, the term of this patent is extended or adjusted under 35 U.S.C. 154(b) by 136 days.

(21) Appl. No.: 11/264,552

(22) Filed: Nov. 1, 2005

(65) Prior Publication Data

US 2007/0098506 A1    May 3, 2007

(51) Int. Cl.
*B23C 5/10* (2006.01)

(52) U.S. Cl. .............. 407/59; 407/60; 407/61; 407/54; 408/230

(58) Field of Classification Search ............. 407/53–63; 408/223, 224, 227, 229, 230
See application file for complete search history.

(56) References Cited

U.S. PATENT DOCUMENTS

| | | | |
|---|---|---|---|
| 2,855,657 A | 10/1958 | Erhardt | 407/63 |
| 3,548,476 A | 12/1970 | Cave et al. | 291/3 |
| 3,736,634 A * | 6/1973 | Sonnie | 407/54 |
| 4,212,568 A | 7/1980 | Minicozzi | 407/53 |
| 4,285,618 A | 8/1981 | Shanley, Jr. | 407/54 |
| 4,497,600 A | 2/1985 | Kishimoto | 407/53 |
| 4,721,421 A * | 1/1988 | Klinger | 407/63 |
| 4,810,136 A * | 3/1989 | Paige | 407/54 |
| 4,984,944 A * | 1/1991 | Pennington et al. | 408/223 |
| 5,049,009 A | 9/1991 | Beck et al. | 407/57 |
| 5,160,232 A * | 11/1992 | Maier | 408/223 |
| 5,221,163 A * | 6/1993 | Nishimura | 407/53 |
| 6,164,876 A * | 12/2000 | Cordovano | 407/59 |
| 6,368,030 B1 | 4/2002 | Sato et al. | 407/53 |
| 7,399,147 B1 * | 7/2008 | VanDyke, Jr. | 407/53 |
| 2002/0106252 A1 | 8/2002 | Tsuzuki et al. | 407/53 |

(Continued)

FOREIGN PATENT DOCUMENTS

DE    3730377 A1 *    3/1989

(Continued)

OTHER PUBLICATIONS

"Introducing the *PRO-4 21st Century Tooling By Promax", Promax Tools, LP, http://www.promaxtools.com/PROMAX%20Letter.doc.

(Continued)

*Primary Examiner*—Boyer D Ashley
*Assistant Examiner*—Sara Addisu
(74) *Attorney, Agent, or Firm*—O'Shea Getz P.C.

(57) ABSTRACT

A rotary cutting tool with a longitudinal axis is provided that includes a shank portion, a cutting portion, and a plurality of chip-breaking features. The cutting portion, which extends out from the shank portion, includes a length, a plurality of blades and a plurality of flutes. The blades and flutes extend substantially all of the length of the cutting portion. Each blade includes a leading face side, a trailing face side, and a land surface that extends between the leading face side and the trailing face side. The plurality of chip-breaking features are disposed in the land surfaces of the blades, and non-uniformly distributed among the blades.

9 Claims, 7 Drawing Sheets

U.S. PATENT DOCUMENTS

| | | | |
|---|---|---|---|
| 2003/0118411 A1 | 6/2003 | Flynn et al. | 407/53 |
| 2004/0105729 A1 | 6/2004 | Giessler et al. | 407/53 |

FOREIGN PATENT DOCUMENTS

| | | | | |
|---|---|---|---|---|
| DE | 20022045 | 3/2001 | | 5/20 |
| GB | 1086815 | 10/1967 | | |
| JP | 60161014 | 8/1985 | | 5/10 |
| JP | 04275813 A | * | 10/1992 | |
| JP | 09057519 | 3/1997 | | 5/10 |
| JP | 2003117906 | 4/2003 | | |
| JP | 2003251516 | 9/2003 | | 5/10 |

OTHER PUBLICATIONS

"FinShred", Iscar News Cutting Tools, www.iscar.com.

* cited by examiner

ROTARY CUTTING TOOL WITH NON-UNIFORM DISTRIBUTION OF CHIP-BREAKING FEATURES

BACKGROUND OF THE INVENTION

1. Field of the Invention

The present invention relates to rotary cutting tools in general, and to rotary cutting tools having chip-breaking features in particular.

2. Background Information

Rotary cutting tools such as end mills typically have a cylindrical configuration that includes a shank portion and a cutting portion. The cutting portion contains a plurality of helically disposed cutting blades that extend from a first end (i.e., the "shank end") of the cutting portion adjacent the shank portion, toward the opposite end (i.e., the "free end") of the cutting portion. In some embodiments, the cutting edges of the helical blades are disposed along a substantially constant radius with respect to the longitudinal axis of the tool. In other embodiments, generally referred to as "tapered" cutting tools, the cutting portion is substantially frustoconical in shape; i.e., the cutting edge of each blade has a constantly decreasing radius with respect to the longitudinal axis of the tool as the cutting edge extends from the shank end of the cutting portion to the free end. The cutting edges of the blades in a tapered rotary cutting tool are at the same radius from the longitudinal axis of the tool in any plane through the cutting portion and perpendicular to the longitudinal axis of the tool. In still other end mill embodiments, generally referred to as "straight-fluted" rotary cutting tools, the cutting edges of the blades extend parallel to the longitudinal axis of the tool.

There are several inherent problems in the use of any of the conventional rotary cutting tools described above. Generally, these problems manifest themselves in excessive wear and relatively poor cutting actions, or both, due to the fact that the entire length of the cutting edge may be applied to the workpiece at the same time, and due to the fact that continuous chips are produced which are not adequately removed from the work area. There have been many attempts to improve the cutting action and decrease the wear in such tools, and these attempts usually involve the use of so called "chip breakers" in the form of relatively deep notches cut transversely into the cutting blade at spaced intervals, or some similar form of providing an interrupted cutting edge along each blade. One such form as hereinabove referred to is a "chip breaker" described in U.S. Pat. No. 2,855,657, issued Oct. 14, 1958, which discloses that the cutting edge of each blade is provided at uniformly spaced intervals along each helical blade with notches of substantial depth which are ground therein for the purpose of interrupting the chips produced by the plurality of helically disposed parallel cutting blades. It is further noted that the notches in successive blades circumferentially of the tool are slightly axially offset, this effect preferably being obtained by grinding such notches in a low pitch helical path circumferentially of the tool. The '657 patent further discloses a shallow bevel merging with each such notch and formed on one side of the notch of one blade and on an opposite side of such notch of the next adjacent blade so that they alternate first to one side and then to the other. The purpose of such arrangement is to balance out the endwise thrust on the tool and to maintain the torque more nearly centered. This attempted solution to the aforementioned problems has met with some success in improvement of tool life and in facilitating chip removal from the work area, although such success is due primarily to the fact that smaller, discontinuous chips are produced which may be more readily removed from the work area. In other words, the solutions have been directed primarily to a form of the chip produced, rather than removal of the chips from the work area. Also, in the construction as suggested by the '657 patent wherein the helical cutting edges are interrupted axially of the body by one or more helical grooves which spiral about the body at either the same or different pitches as the flutes, but in opposite directions, that is, the flutes spiral in the right-hand direction, whereas the grooves spiral in a left-hand direction, the grooves then are disposed in a direction which impedes chip removal. That is, a chip at the leading edge of a cutting tool defined by a groove normally tends to move towards the shank end of the cutter along the helix of the flute, but if the chip enters the groove, it is urged toward the cutting end of the cutter. As a result, the pressure relief advantages caused by grooves are dissipated to some extent, the tool operates at a higher temperature, and the smoothness of the cut suffers.

Several attempts have been made in the prior art to solve this problem. For example, U.S. Pat. No. 3,548,476 discloses a cutter having a plurality of helical flutes of uniform length and depth which form a plurality of helical cutting edges circumferentially spaced from one another by the flutes and which spiral about the axis of the body in the same direction at the same pitch as the flutes. Each of the cutting edges extends radially of the body and merges smoothly with its associated cutting edge which spirals in a right-hand direction about the axis of the body at a predetermined angle. These cutting edges are interrupted longitudinally at spaced intervals by a plurality of uniformly spaced notches. The notches are formed by a groove which spirals about the axis of the body in the same direction (right-hand helix for both flutes and notch groove) of the flutes but at a steeper pitch. The helix on which the notches are formed and the width of the notches in the blades is selected so that the circumferentially adjacent blades on successive cutting edges are offset axially from one another by an amount such that each circumferentially successive blade has a portion which follows a portion of a groove in a preceding cutting edge. The amount of offset between successive blades should be such that, for each complete revolution of the body, the blade trailing any given notch will more than offset the length of the notch. A cutting tool construction in accordance with the disclosure of the '476 patent defines advantages in that the formation of discontinuous chips facilitates chip removal and the spiraling of the notches in the same direction as the flutes further facilitates chip removal. Moreover the discontinuous cutting blades result in less drag or resistance to rotation of the tool when it is in operative engagement with a workpiece, thereby reducing deflection of the tool and permitting cutting of the workpiece to closer tolerances than would otherwise be possible, enabling the tool to operate at a relatively low temperature and thereby increasing tool life. The specific problems inherent in the cutting tool described in the '476 patent, however, is that the notches which form the groove which spirals about the axis of the body in the same direction as the flutes generate a strong longitudinal force during a cut and, eventually, as the tool dulls this force will become sufficient to pull the cutting tool from its workholding device.

U.S. Pat. No. 4,212,568, issued to Minicozzi, is also directed to the problem of facilitating chip removal from the work area while improving the tool life. Minicozzi discloses that the leading edge and trailing edge of each blade is interrupted by a plurality of relatively shallow transverse depressions of relatively large radius arcuate cross-section resulting in cutting edges with a variable rake angle which tends to reduce tool wear. Further, the sinusoidally undulating surface of the cutting face of each blade gives rise to a rake angle at each cutting edge which varies continuously along the length of the cutting edge, facilitating the formation of relatively small chips. When these chips move through the space where the cutting and trailing face surfaces are convex they tend to squeeze at these areas and tend to spring away from the workpiece and the cutting tool when free to do so, in this way facilitating chip removal. The cutting tool disclosed in Minicozzi is time consuming to manufacture and, therefore, expensive. Additionally, its chip removing feature provides little improvement to the feed and speed characteristics of the cut.

U.S. Pat. No. 4,285,618, issued to Shanley, Jr., recognizes the need for rapid cutting and the requirement of smooth dimension finishing qualities simultaneously. Accordingly, Shanley, Jr. discloses a conventional cutting tool of a hard metal body whose cutting portion surface is formed into a plurality of blades separated by flutes, each blade having a leading side, a cutting edge on the leading side, a land, and a trailing side of face; at least two of the blades having at least one smooth segment, wherein the land and cutting edge are even and unbroken, and at least one serrated segment formed with crests that are flat, round, or sinusoidal, wherein the land consists essentially of a row of cutting blades, adjacent blades in the lands being separated from each other by a transverse groove in the blade. The smooth end serrated segments are located in staggered positions from blade to blade, so that in the course of one complete revolution of the cutter, each point along a surface being formed by the cutter will be contacted by at least one smooth segment and at least one serrated segment. The serrated segments are arranged in such a pattern from blade to blade that continuous, imaginary lines passing across each blade at precisely the midpoint of each serrated segment would define a helix of uniform angle around the cutting section measured from a line which is parallel to the shank section. Shanley, Jr. further discloses that the helix may be right-handed or left-handed such that the helix of the serrated segments is the same as the helix of the blades on the cutting portion of the tool. Generally, the cutter will be capable of faster metal removal if the lay of the helical serration pattern is opposite that of the helical pattern of the blades. Shanley Jr. discloses that the blades in the serrated segments may be formed with flat, rounded or sinusoidal crests. This type of blade formation, however, will result in drag and galling of the leading edge of the cutting blade since the leading edge of the cutting tool has a negative rake angle.

U.S. Pat. No. 4,497,600, issued to Kishimoto, discloses an end mill wherein the shape and the arrangement of the notch required for the blade can be freely selected without using thread cutting. Kishimoto discloses a cutting tool wherein along the whole circumferential surface of each blade, notches are machined at prescribed intervals, extending transverse to the length of each blade. Each notch is shifted slightly along the blade toward the tool end or the shank end relative to a corresponding notch on the preceding blade. When X is taken as the width of the blade surface between notches, Y as the width of the notch, and Z as the amount of shift of a notch relative to the corresponding notch in the adjacent preceding blade, the shift (Z) of the notch is at least equal to (X+Y)/(N) (where N is the number of blades). In the case of shifting the notch toward the tool end, the inclination of the notch on its own axis is toward the shank end and when shifting the notch toward the shank end, the inclination of the notch on its own axis is toward the tool end. Since the notches are formed at the prescribed intervals and with a shift of a prescribed amount, rather than being formed along a helical path as in a screw thread, the side clearance of the notch is not limited by the number of blades. Since the direction of the side clearance is varied by the direction of the shift of the notches relative to the preceding and succeeding blades, the cutting by the main blade is formed with an effect of elevating the cutting performance. The angle of the notch and the shape of the notch can be freely selected depending on the material to be cut. In the conventional tool in which the notch is formed along a helix, such as a thread, these values are fixed. The disclosure of Kishimoto results in a notch in a blade which will have a negative rake angle on the leading or trailing edge of the blade form. The negative rake angle causes drag and galling of the metal at the cutting edge of the blade as well as heat build up and higher wear or shorter life of the cutting tool.

What is needed is a rotary cutting tool that overcomes the shortcomings of the prior art.

DISCLOSURE OF THE INVENTION

A rotary cutting tool with a longitudinal axis is provided that includes a shank portion, a cutting portion, and a plurality of chip-breaking features. The cutting portion, which extends out from the shank portion, includes a length, a plurality of blades and a plurality of flutes. The blades and flutes extend substantially all of the length of the cutting portion. Each blade includes a leading face side, a trailing face side, and a land surface that extends between the leading face side and the trailing face side. The plurality of chip-breaking features are disposed in the land surfaces of the blades, and non-uniformly distributed among the blades.

In preferred embodiments of the present invention rotary cutting tool, the chip-breaking features are non-uniformly distributed within each blade, and/or are non-uniformly distributed relative to adjacent blades within the rotary cutting tool. The pattern of non-uniformly distributed chip-breaking features is such that the material being machined at any given position is not subject to a uniform pattern of features as the tool rotates. As a result, the tool is not subject to significant uniform periodic forces that could give rise to an undesirable harmonic response under acceptable operating conditions.

In other preferred embodiments of the present invention, a rotary cutting tool is provided that, for a given set of operating conditions, has a plurality of blades each with a selectively chosen loading value. The "loading value" reflects the load placed on the blade during operation. The blades adjacent one another have loading values of different magnitudes to prevent or minimize the tool being subject to significant uniform periodic forces that could give rise to an undesirable harmonic response to the aforesaid operating conditions. The loading value of a particular blade is dependent on the configuration of the blade, which configuration includes chip-breaking features disposed in the land surfaces of the blades. Techniques for determining the loading of a blade are known in the art and will not therefore be described here.

There is considerable advantage in being able to aggressively machine with a rotary cutting tool; e.g., applications where a machining pass is made at a depth greater than the diameter of the tool and/or at an accelerated feed rate. Aggressive machining with many prior art rotary cutting tools is not practically possible, however, because it creates undesirable harmonic responses (i.e., vibrations) within the tool. The non-uniform distribution of chip-breaking features within the present invention rotary cutting tool permits aggressive machining with most materials without creating undesirable harmonic responses.

Another advantage of the present invention rotary cutting tool is that chip-breaking features that can remove material away from the tool aggressively (i.e., "rough" the material out) can be combined with chip-breaking features that remove less material, but leave an acceptable fine finish. As a result, a machining operation that may have historically required two separate cutting tools can now be done with one, thereby saving valuable machining time.

Another advantage of the present invention rotary cutting tool is that the chip-breaking features (sometimes referred to as "chip breakers", "knuckles" or "notches") generate a positive relief at the cutting edges, leading face edges, and trailing face edges and thereby significantly enhance the cutting performance of the rotary cutting tool.

Another advantage of the present invention rotary cutting tool is that the loading per blade for a given set of operating conditions can be "tuned" to minimize undesirable harmonic response and optimize the performance of the rotary cutting tool.

In sum, the present invention rotary cutting tool gives rise to a number of advantages which manifest themselves in superior performance, highly improved wear characteristics, ease of manufacture and relatively simple maintenance. The latter arises because the cutting tool of the invention is provided with a positive rake relief angle of the cutting edges, and positive relief angles of the trailing and leading edges of the cutting blade, and while having a non-conventional form, may nevertheless be sharpened and reground with conventional equipment.

It is, of course, to be understood that the present invention is by no means limited to the particular construction shown in the accompanying drawings, but also encompasses many modifications within the scope of the appended claims. For example, as previously noted, the invention has been shown in conjunction with a spirally fluted cutting tool. However, the invention may also be useful with other forms of cutting tools, such as straight fluted cutting tools, tapered cutting tools, variable helix cutting tools, variable index cutting tools and, indeed, may be applicable to still other types of rotary cutting tools. Further, it will be appreciated that such cutting tools may vary considerably in diameter and size, and that the depth of cut of the flute employed during construction of the cutting tool may vary considerably depending upon the desired cutting edge.

These and other features and advantages of the present invention will become apparent in light of the drawings and detailed description of the present invention provided below.

DETAILED DESCRIPTION OF THE INVENTION

Figure 1:
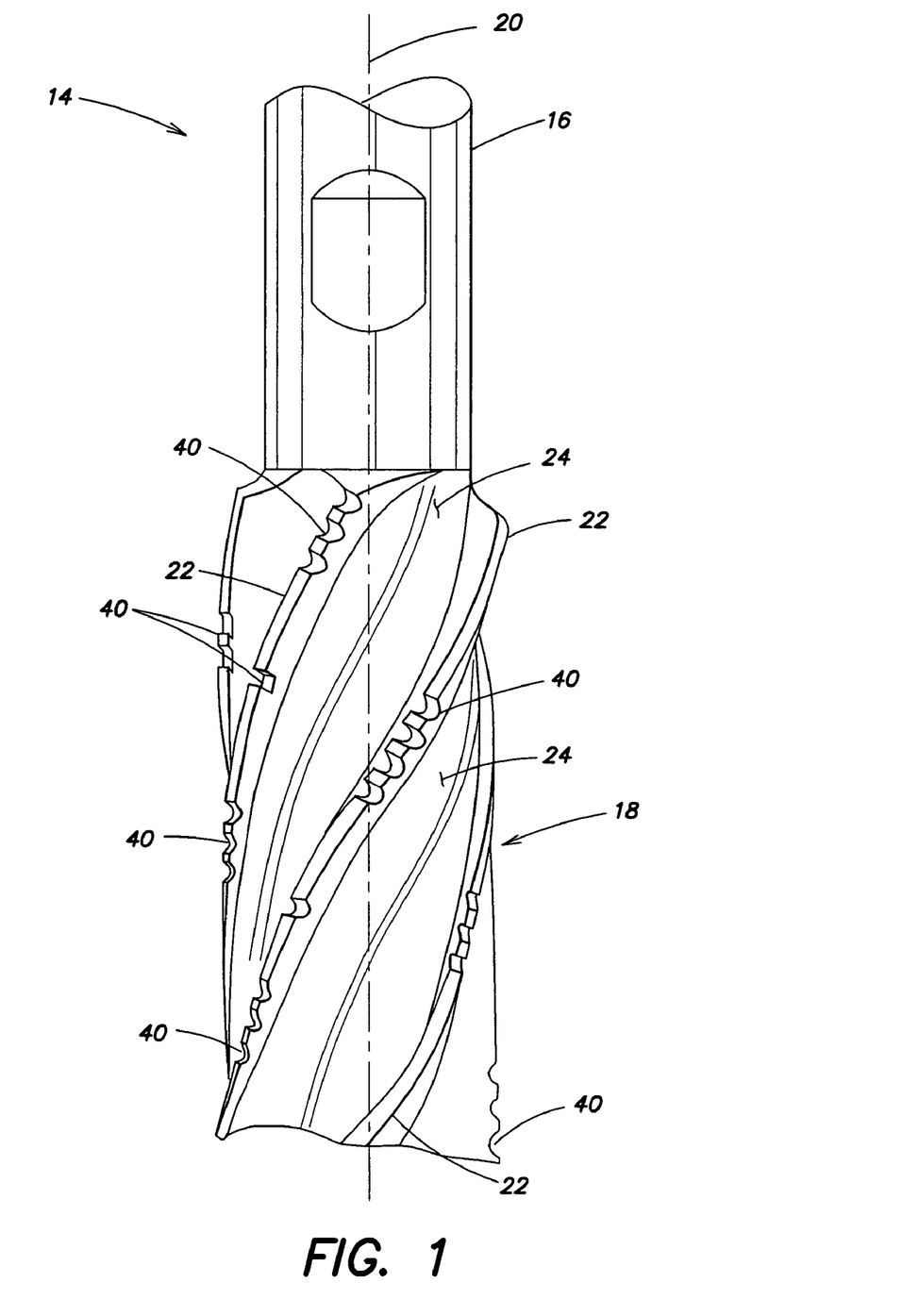
FIG. 1 is a planar view of a present invention rotary cutting tool.
Figure 2:
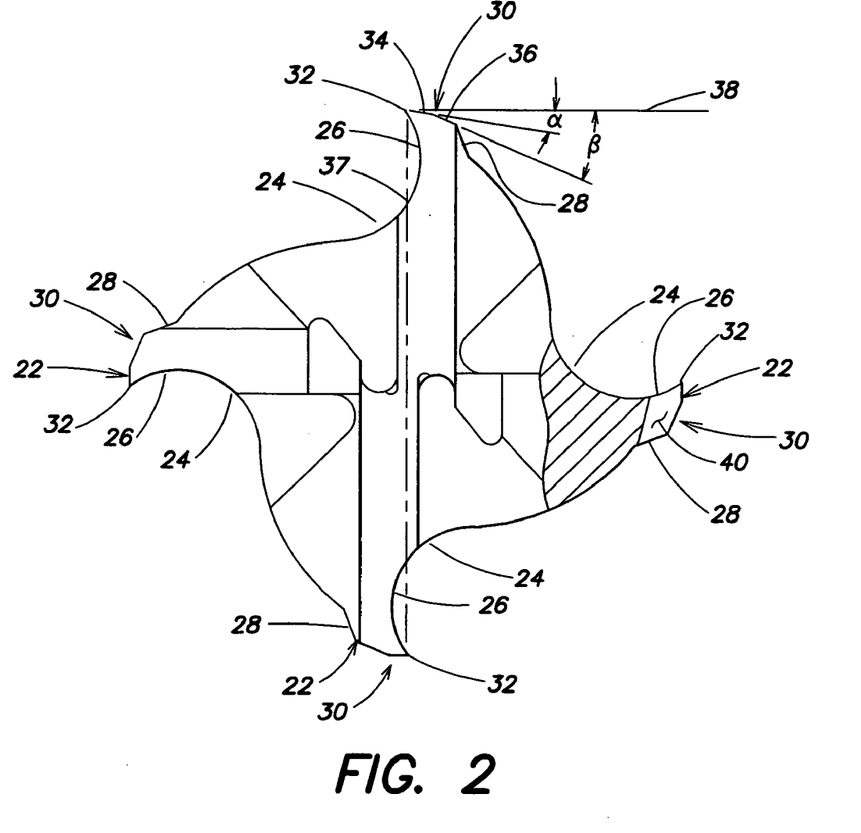
FIG. 2 is an end view of a four-blade rotary cutting tool.
Figure 3:
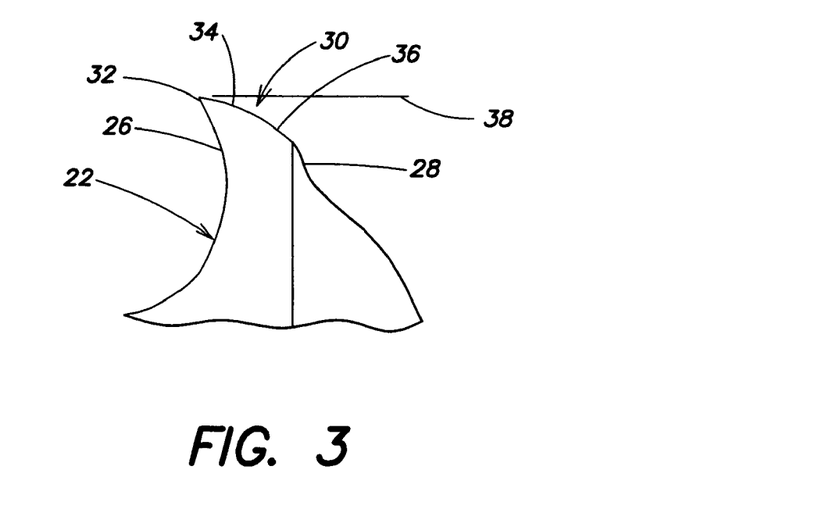
FIG. 3 is a partial view of a rotary cutting tool blade.
Figure 4A:
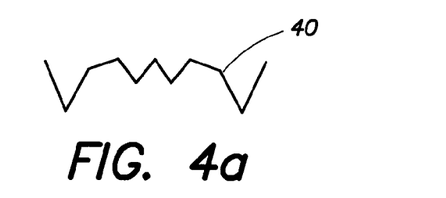
FIGS. 4a-4g are diagrammatic examples of singular chip-breaking features.
Figure 4B:
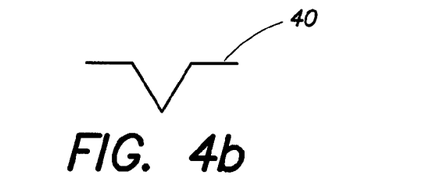
Figure 4C:
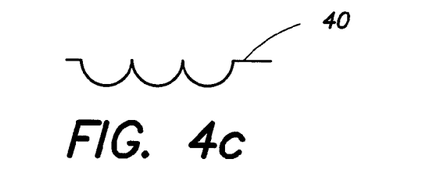
Figure 4D:
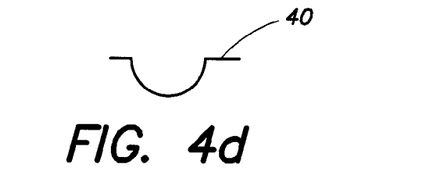
Figure 4E:
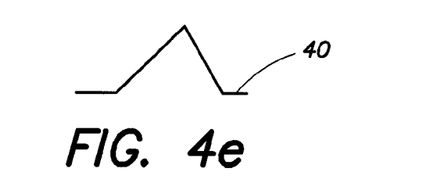
Figure 4F:
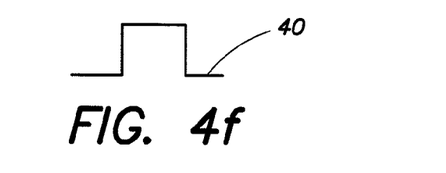
Figure 4G:
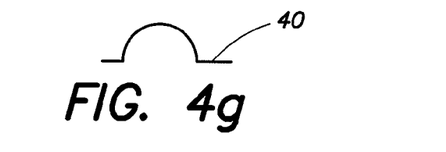
Figure 12:
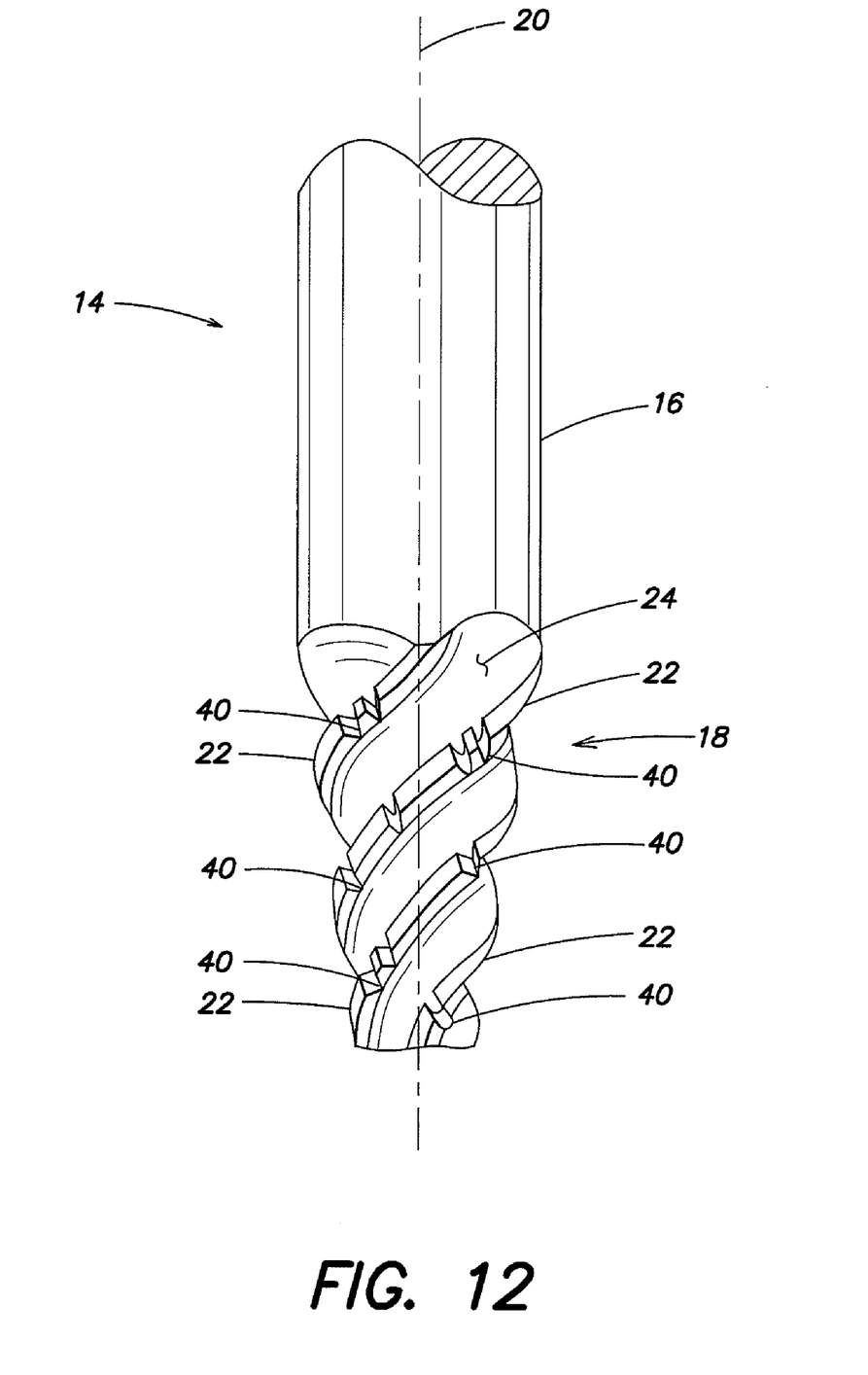
FIG. 12 is a planar view of a frustoconically shaped rotary cutting tool.

Now referring to FIGS. 1-3, a rotary cutting tool 14 is provided that includes a shank portion 16, a cutting portion 18, and a longitudinal axis 20. The overall shape of the cutting portion 18 may be, but is not limited to, a cylindrical shape or a frustoconical shape (e.g., see FIG. 12). The cutting portion 18 includes a plurality of blades 22 separated by flutes 24 extending the length of the cutting portion 18. Each of the blades 22 has a leading face side 26, a trailing face side 28, and a land surface 30 bridging the leading face side 26 and trailing face side 28. The intersection between the leading face side 26 and the land surface 30 forms a cutting edge 32 for the respective blade 22. In some embodiments the blades 22 and flutes 24 of the cutting portion 18 extend helically within the cutting portion 18, and in other embodiments, the blades 22 and flutes 24 are "straight flutes" that extend parallel to the longitudinal axis 20.

In some embodiments the land surface 30 of a blade 22 includes a plurality of portions. In the embodiment shown in FIG. 2, for example, the land surface 30 includes a primary portion 34 and a secondary portion 36. The primary portion 34 is disposed contiguous with the cutting edge 32, extending at an angle "α" relative to a tangential line 38 drawn at the cutting edge 32. The secondary portion 36 is disposed on the side of the primary portion 34 opposite the cutting edge 32, at an angle "β" relative to the aforesaid tangential line 38, where the magnitude of angle "β" is greater than the magnitude of angle "α". In other embodiments, the land surface 30 may include additional portions; e.g., a tertiary portion disposed on the side of the second portion 36 opposite the first portion 34. A land surface portion may extend linearly within a plane extending perpendicular to the longitudinal axis 20. FIG. 2 shows the primary and secondary portions 34,36 extending linearly. Alternatively, a land surface portion may extend arcuately within a plane extending perpendicular to the longitudinal axis 20. FIG. 3 shows the secondary portion 36 extending arcuately (sometimes referred to as an "eccentric relief"), blending into the trailing face side 28. FIG. 2 also shows the rake angle 37 relative to the other elements of the blade 22.

A plurality of chip-breaking features 40 are disposed in the land surface 30. The features 40 disrupt the otherwise continuous cutting edge 32 and thereby create a cutting edge 32 having a varied geometry at the intersection of the leading face side 26 and the land surface 30. During operation, the chip breaking features 40 generate a positive pressure relief in the blade 22 in which they are disposed, and thereby significantly enhance the cutting performance of the rotary cutting tool 14.

Figure 5A:
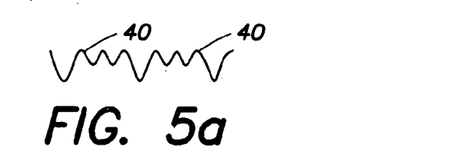
FIGS. 5a-5p are diagrammatic examples of groups of more than one chip-breaking features.
Figure 5B:
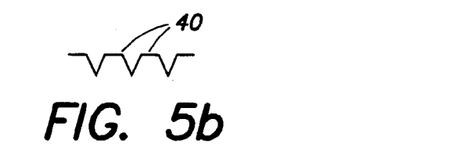
Figure 5C:
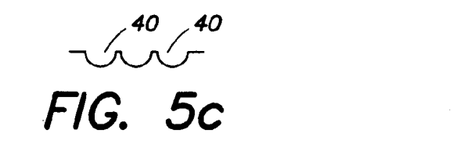
Figure 5D:
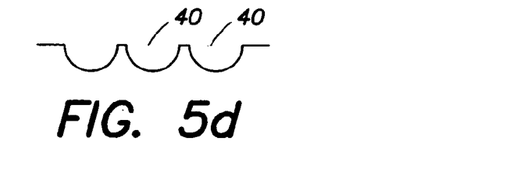
Figure 5E:
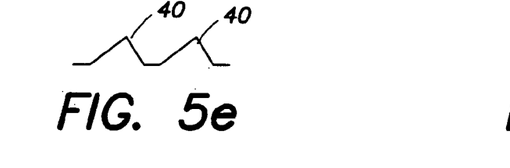
Figure 5F:
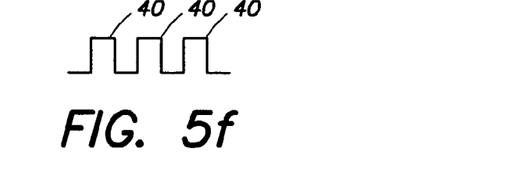
Figure 5G:
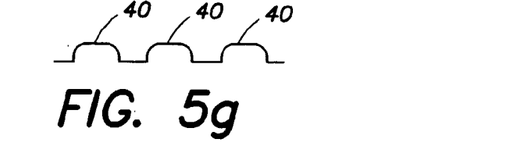
Figure 5H:
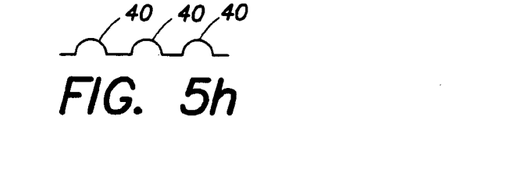
Figure 5I:
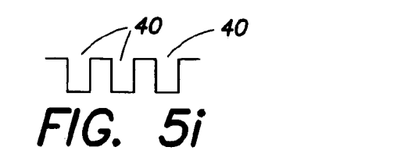
Figure 5J:
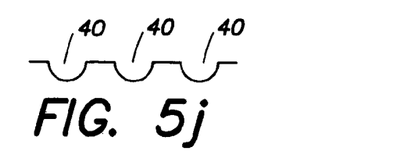
Figure 5K:
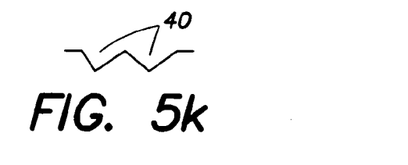
Figure 5L:
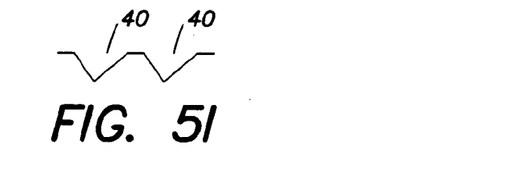
Figure 5M:
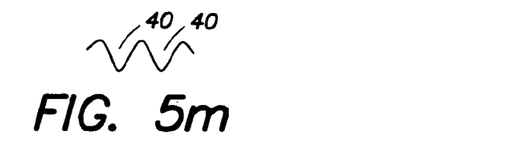
Figure 5N:
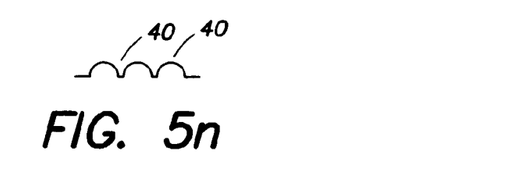
Figure 5O:
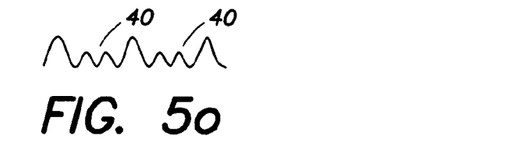
Figure 5P:
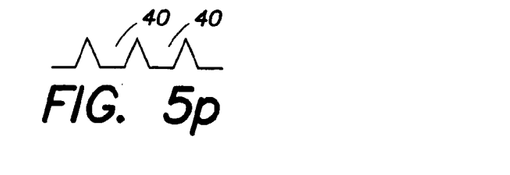

The chip-breaking features 40 can assume a variety of different geometric configurations. FIGS. 4a-4g show diagrammatic examples of singular chip-breaking feature geometric configurations. FIGS. 5a-5p show examples of different types of groups of more than one chip-breaking feature 40. FIGS. 5f and 5i, for example, show features 40 having a substantially rectangular geometry. As another example, FIGS. 5b, 5e, 5l, 5m, and 5p show features 40 having a substantially triangular geometry. As a further example, FIGS. 5d and 5j show features 40 having an arcuately-shaped base. The feature geometric configuration types are not limited to the examples shown in FIGS. 4a-4g and 5a-5p.

In preferred embodiments of the present invention rotary cutting tool 14, the chip-breaking features 40 are non-uniformly distributed within each blade 22, and/or are non-uniformly distributed relative to adjacent blades 22 within the rotary cutting tool 14. The pattern of non-uniformly distributed chip-breaking features 40 is such that the material being machined at any given position is not subject to a uniform pattern of features 40 as the tool 14 rotates. As a result, the tool 14 is not subject to significant uniform periodic forces that can give rise to an undesirable harmonic response under acceptable operating conditions. The non-uniform distribution can be created by mechanisms such as, but not limited to: 1) dissimilar spacing between chip-breaking features 40 within a particular blade 22; 2) dissimilar feature 40 spacing between adjacent blades 22; 3) dissimilar feature 40 types within a particular blade 22; 4) dissimilar feature 40 types in adjacent blades 22; 5) dissimilar groupings of features 40 within a particular blade 22; 6) dissimilar groupings of features 40 between adjacent features 40; or combinations thereof, etc.

Figure 6:
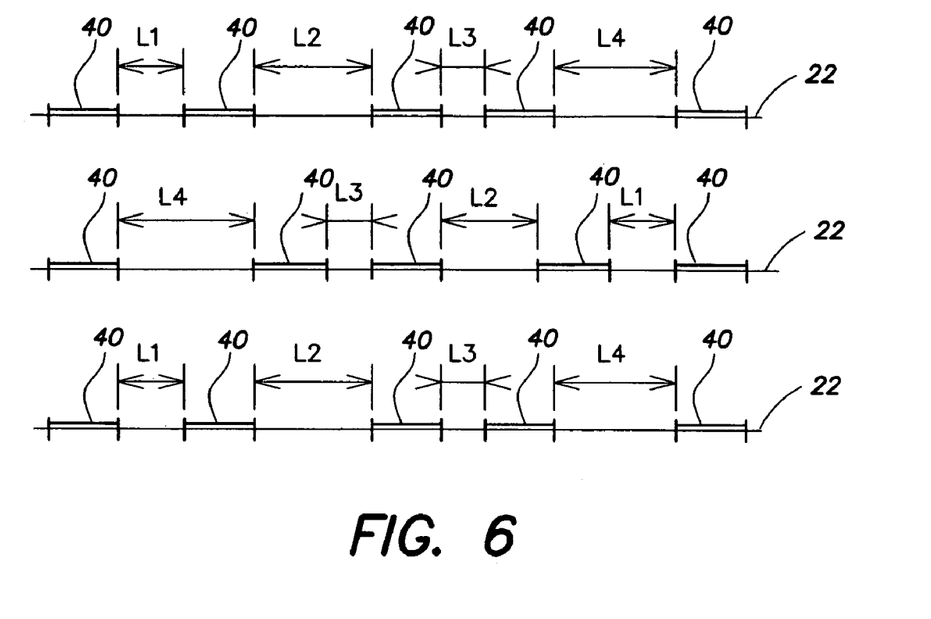
FIG. 6 is a diagrammatic depiction of a three blade rotary cutting tool having non-uniform spacing between groups.
Figure 7:
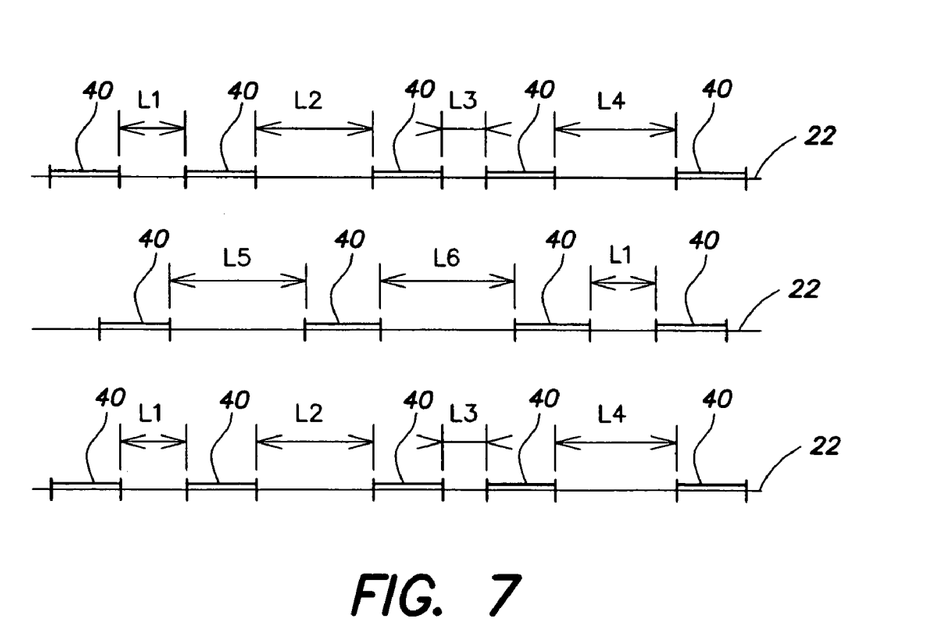
FIG. 7 is a diagrammatic depiction of a three blade rotary cutting tool having non-uniform spacing between groups in adjacent blades.

Examples illustrating non-uniformity created by spacing are diagrammatically shown in FIGS. 6 and 7. In this embodiment, a plurality of chip-breaking features 40 are disposed in the land surface 30 of a first blade 22, separated from one another by unequal space intervals; e.g., a first feature 40 is spaced apart from an adjacent second feature 40 by distance L1, and the second feature 40 is spaced apart from a third feature 40 by distance L2, where L1 is not equal to L2, and so on. The chip-breaking features 40 in an adjacent second blade 22 can be separated from one another by the same distances L1, L2, etc., but can be arranged so that similar separation distances are not aligned in adjacent blades 22 (see FIG. 6). Alternatively, the separation distances between the chip-breaking features 40 in the second blade 22 can be different than those within the first blade 22 (see FIG. 7). In both examples, the chip-breaking features 40 are arranged in a non-uniform distribution within each blade 22, and relative to adjacent blades 22.

Figure 8:
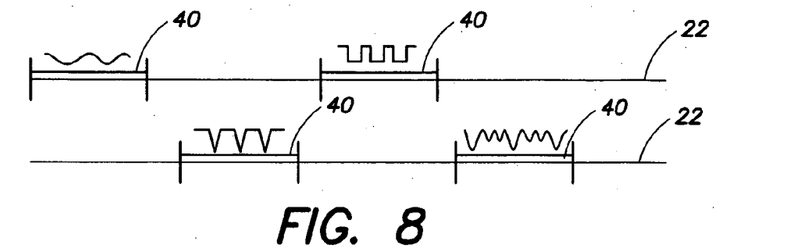
FIG. 8 is a diagrammatic depiction of a two blade rotary cutting tool having chip-breaking features with non-uniform geometric configuration types.
Figure 9:
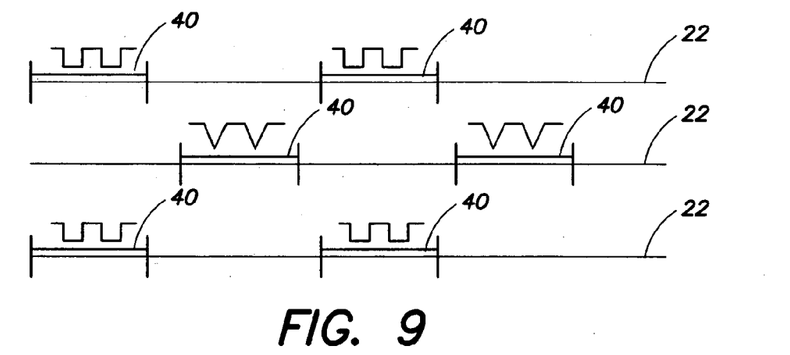
FIG. 9 is a diagrammatic depiction of a three blade rotary cutting tool having chip-breaking features with non-uniform geometric configuration types between adjacent blades.

Referring to FIGS. 8 and 9, the chip-breaking feature 40 or features 40 in the each blade 22 may all be the same type (i.e., all have the same geometric configuration type), or there may be more than one type. Examples of geometric configuration types for a chip-breaking feature 40 are disclosed above. Embodiments where there is more than one geometric configuration type within a particular blade 22, and/or where there are dissimilar geometric configuration types within adjacent blades 22, are examples of non-uniformity created by chip-breaking features 40 having different geometric configurations. In the embodiment shown in FIG. 8, for example, the chip-breaking features 40 disposed in the land surface 30 of each blade 22 vary in geometric configuration type. In the embodiment shown in FIG. 9, the chip-breaking features 40 within a first blade 22 all have a first type of geometric configuration, and all of the chip-breaking features 40 within a second blade 22 have a second type of geometric configuration. The first and second geometric configuration types are different from one another.

Figure 10:
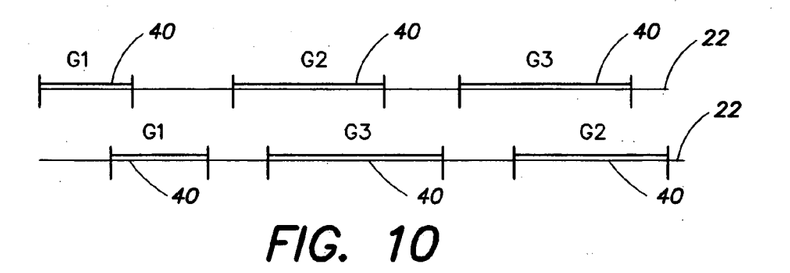
FIG. 10 is a diagrammatic depiction of a two blade rotary cutting tool having chip-breaking features in non-uniform number groups.
Figure 11:
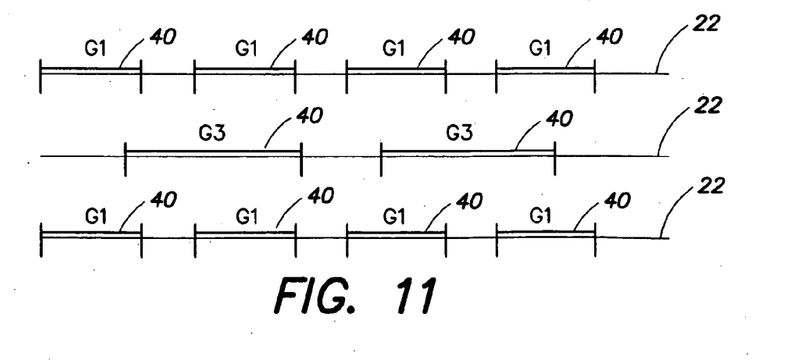
FIG. 11 is a diagrammatic depiction of a three blade rotary cutting tool having chip-breaking features in non-uniform number groups between adjacent blades.

Examples illustrating non-uniformity created by using different groupings of chip-breaking features 40 are shown in FIGS. 10 and 11. In the embodiment shown in FIG. 10, groups of one or more chip-breaking features 40 (G1, G2, G3) are disposed in the land surface 30 of each blade 22, spaced apart from one another. The first group of features 40 (G1), has "n" number of features 40, the second group of features 40 (G2), has "m" number of features 40, and the third group of features 40 (G3) has "p" number of features 40, where "m", "n", and "p" are each integers, and wherein "m", "n" and "p" do not equal one another. To illustrate this embodiment, the diagrammatic depiction of FIG. 10 shows G2 larger than G1 to symbolize that second group G2 has a greater number of features 40 than does the first group G1, and the third group G3 is shown larger than G2 to symbolize that third group G3 has a greater number of features 40 than does the second group G2.

In the embodiment shown in FIG. 11, a first blade 22 has a plurality of groups of "n" number of chip-breaking features 40, and a second blade 22 has a plurality of groups of "m" number of chip-breaking features 40, where "n" and "m" are non-equal integers. The groups of "n" number of chip-breaking features 40 in the first blade 22 and the groups of "m" number of features 40 in the second blade 22 are not aligned with one another, thereby creating the non-uniform distribution within the blades 22.

In some embodiments of the present invention, the rotary cutting tool 14 has a plurality of blades 22 each configured with one or more chip-breaking features 40 so as to have a selectively chosen loading value for a given set of operating conditions. The blades 22 adjacent one another have loading values of different magnitudes to prevent or minimize the tool 14 being subject to significant uniform periodic forces that could give rise to an undesirable harmonic response to the aforesaid operating conditions. The loading value of a particular blade 22 is dependent on the configuration of the blade 22, which configuration includes chip-breaking features 40 disposed in the land surfaces 30 of the blades 22.

The above described embodiments represent a few illustrative examples of the present invention, and do not represent all of the possible configurations. In addition, more than one of the above described embodiments may also be used in combination to create the non-uniformity of the present invention.

It will be obvious to those skilled in the art that various changes may be made without departing from the scope of the present invention and that the invention is not to be considered limited to what is described and exemplified in the specification. For example, the drawings and Detailed Description section include descriptions of rotary cutting tools having two and three flutes. The present invention is not limited to rotary cutting tools having two and three blades 22. Alternative embodiments may have a greater number of blades 22.

What is claimed is:

1. A rotary cutting tool with a longitudinal axis, comprising:
a shank portion;
a cutting portion extending between the shank portion and a free end, the cutting portion having a length, and at least three blades, wherein the blades extend substantially all of the length of the cutting portion, and wherein each of the blades includes a leading face side, a trailing face side, and a land surface extending between the leading face side and the trailing face side; and
a plurality of chip-breaking features disposed in the land surface of each blade in a pattern that extends along the length of the cutting portion, which chip-breaking features disrupt an otherwise continuous land surface, and the pattern of chip-breaking features in each blade is different from the pattern of chip-breaking features in adjacent blades thereby creating a non-uniform distribution of chip-breaking features among the blades;

wherein the plurality of chip-breaking features includes a first group of features, a second group of features, and a third group of features, which groups are axially spaced and, disposed in a particular one of the plurality of blades;

wherein each group contains at least one feature; and wherein a first distance extending between a first feature of the first group and a first feature of the second group is unequal to a second distance extending between the first feature of the second group and a first feature of the third group, wherein the first feature of each group is the feature within the group disposed closest to the free end of the tool.

2. The rotary cutting tool of claim 1, wherein the cutting portion is frustroconically shaped.

3. The rotary cutting tool of claim 2, wherein the blades extend helically within the cutting portion.

4. The rotary cutting tool of claim 1, wherein the cutting portion is cylindrically shaped.

5. The rotary cutting tool of claim 4, wherein the blades extend helically within the cutting portion.

6. The rotary cutting tool of claim 1,
wherein the first distance of a first of the plurality of blades is not equal to the first distance of a second of the plurality of blades, and the second distance of the first of the plurality of blades is not equal to the second distance of the second of the plurality of blades.

7. A rotary cutting tool with a longitudinal axis, comprising:

a shank portion;

a cutting portion extending out from the shank portion, the cutting portion having a length, and at least three blades, wherein the blades extend substantially all of the length of the cutting portion, and wherein each of the blades includes a leading face side, a trailing face side, and a land surface extending between the leading face side and the trailing face side; and a plurality of chip-breaking features disposed in the land surface of each blade in a pattern that extends along the length of the cutting portion, and non-uniformly distributed among the blades, such that the pattern of chip-breaking features disposed within each blade is different from the pattern of chip breaking features disposed in each other blade;

wherein the plurality of chip-breaking features disposed in the land surfaces of the blades are arranged in axially spaced groups of more than one feature, and wherein a particular one of the blades has at least a first group of features with "n" number of features, and a second group of features with "m" number of features, wherein "m" and "n" are integers and wherein "n" is greater than or less than "m".

8. A rotary cutting tool with a longitudinal axis, comprising:

a shank portion;

a cutting portion extending out from the shank portion, the cutting portion having a length, and at least three blades, wherein the blades extend substantially all of the length of the cutting portion, and wherein each of the blades includes a leading face side, a trailing face side, and a land surface extending between the leading face side and the trailing face side; and a plurality of chip-breaking features disposed in the land surface of each blade in a pattern that extends along the length of the cutting portion, and non-uniformly distributed among the blades, such that the pattern of chip-breaking features disposed within each blade is different from the pattern of chip breaking features disposed in each other blade;

wherein at least a first group of "n" number of features and a second group of "m" number of features are disposed in the land surface of a particular blade, said groups axially spaced apart from one another, where "m" and "n" are integers and "n" is greater than or less than "m".

9. A rotary cutting tool with a longitudinal axis, comprising:

a shank portion;

a cutting portion extending out from the shank portion, the cutting portion having a length, and at least three blades, wherein the blades extend substantially all of the length of the cutting portion, and wherein each of the blades includes a leading face side, a trailing face side, and a land surface extending between the leading face side and the trailing face side; and a plurality of chip-breaking features disposed in the land surface of each blade in a pattern that extends along the length of the cutting portion, and non-uniformly distributed among the blades, such that the pattern of chip-breaking features disposed within each blade is different from the pattern of chip breaking features disposed in each other blade;

wherein the plurality of chip-breaking features disposed in the land surfaces of the blades are arranged in axially spaced groups of more than one feature, and wherein at least one group of "n" number of features is disposed in the land surface of a first blade, and at least one group of "m" number of features is disposed in the land surface of a second blade, where "m" and are integers and "n" is greater than or less than "m", and where the first blade is adjacent the second blade.

* * * * *